ated Mar. 17, 1959

2,878,232

COMPOSITIONS OF VINYL AROMATIC POLYMERS AND SYNTHETIC RUBBER STABILIZED WITH TETRA-(2-HYDROXYALKYL) ALKYLENE DIAMINES

William K. Schweitzer, Jr., Midland, Mich., assignor to The Dow Chemical Company, Midland, Mich., a corporation of Delaware No Drawing. Application July 2, 1956
Serial No. 595,066

8 Claims. (Cl. 260—45.5)

This invention concerns compositions of matter which are mechanical mixtures consisting essentially of a predominant amount of a normally hard vinyl aromatic polymer intimately incorporated with a lesser amount of a relatively soft rubbery polymer of butadiene and as stabilizing agents for inhibiting the deteriorating effects of light or heat and air or oxygen upon mechanical properties of the composition, a minor but effective amount of at least one N,N,N',N'-tetra-(2-hydroxyalkyl)alkylene diamine having the general formula:

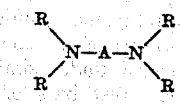

wherein A is an alkylene radical containing from 2 to 6 carbon atoms and R is a 2-hydroxyalkyl radical independently selected from the group consisting of 2-hydroxyethyl and 2-hydroxypropyl radicals.

Compositions of vinyl aromatic polymers and rubber, e. g. mechanical mixtures of a predominant amount of polystyrene and a lesser amount of a natural or a synthetic rubber, are known to undergo changes upon prolonged exposure to heat or light and air or oxygen. The observable symptoms of such changes are discoloring or embrittlement, or both, due in varying measure to the oxygen content of the atmosphere in which they are exposed, the temperature and the presence or absence of sunlight. Such changes of the polymeric material result in lowering of its mechanical properties, e. g. percent elongation, and its appearance. Since the uses of such compositions include the manufacture of molded articles, films, rods, bars, etc., either embrittlement or discoloration which results in deterioration of the properties or appearance of the final product or molded articles is to be avoided.

The provision of stabilized compositions which are mechanical mixtures consisting essentially of a predominant amount of a normally hard vinyl aromatic polymer intimately incorporated with a lesser amount of a relatively soft rubbery polymer of butadiene is the principal object of the invention.

According to the invention the foregoing object is attained by intimately incorporating with a composition of a predominant amount of a vinyl aromatic polymer and a synthetic rubbery polymer of butadiene, a N,N,N',N'-tetra-(2-hydroxyalkyl)alkylene diamine having the aforementioned general formula in amount corresponding to from 0.1 to 5, preferably from 0.4 to 2, percent by weight of the sum of the weights of the polymeric constituents.

The N,N,N',N'-tetra-(2-hydroxyalkyl)alkylene diamines to be employed as stabilizing agents are the totally hydroxypropylated alkylene diamines or totally hydroxyethylated alkylene diamines which alkylene diamines contain from 2 to 6 carbon atoms in the molecule. The compounds can be prepared by condensing the calculated or stoichiometric quantity of ethylene oxide, propylene oxide or mixtures of ethylene oxide and propylene oxide with an alkylene diamine, e. g. by condensing four moles of propylene oxide with one mole of ethylene diamine. The reaction can be carried out by introducing the calculated quantity of alkylene oxide into the alkylene diamine, preferably with stirring, in the presence of a small quantity of water or a saturated aliphatic alcohol as catalyst, at temperatures between 40° and 200° C. and at atmospheric or superatmospheric pressure. A method of making hydroxypropylated alkylene diamines is disclosed in U. S. Patent No. 2,697,118.

The vinyl aromatic polymer starting material can be any thermoplastic resinous polymer of one or more polymerized monovinyl aromatic hydrocarbons of the benzene series such as styrene, vinyl toluene, vinylxylene, ethylvinylbenzene, isopropylstyrene, ethylvinyltoluene, tert.-butyl styrene, or diethylstyrene, or copolymers of at least 70 percent by weight of one or more of such monovinyl aromatic hydrocarbons and not more than 30 percent of alpha-methyl styrene or esters of acrylic or methacrylic acid such as ethyl acrylate, butyl acrylate or methylmethacrylate.

The rubbery polymer of butadiene starting material can be polybutadiene, i. e. homopolymer of butadiene, or a copolymer of at least 40 percent by weight of butadiene and not more than 60 percent of styrene. Copolymers of from 40 to 80 percent by weight of butadiene-1,3 and from 60 to 20 percent of styrene are preferred.

The compositions with which the invention is concerned are intimate mixtures of a predominant amount, preferably from 60 to 95 percent by weight, of the vinyl aromatic polymer incorporated with a lesser amount, suitably from 40 to 5 percent, of the rubbery butadiene polymer, and the N,N,N',N'-tetra-(2-hydroxyalkyl)alkylene diamine stabilizing agent, by mechanically mixing the ingredients with one another at heat-plastifying temperatures for the polymeric components and compounding the ingredients into a uniform composition.

A surprising feature of the invention is that the N,N,N',N'-tetra-(2-hydroxyalkyl)alkylene diamines exhibit a greater stabilizing action for inhibiting the deteriorating effects of light upon exposure of polymeric compositions prepared by heat-plastifying and mechanically working the polymeric ingredients with one another, than is obtained by dissolving a butadiene polymer, e. g. a GR–S type synthetic rubber, in monomeric styrene and heating the solution to polymerize the monomer.

The stabilizing agent can be incorporated with the polymeric materials in usual ways. The polymeric materials can be heat-plastified on compounding rolls, a Banbury mixer, or in a plastic extruder and blended into a uniform composition, after which the stabilizing agent is incorporated with the polymeric material in the desired amount.

The rubbery polymers of butadiene as prepared or supplied to the trade, usually contain small amounts of polymerization inhibitors or antioxidants to prevent deterioration of the rubber prior to its vulcanization or intended use, and the presence of an antioxidant or inhibitor in the rubbery polymer is advantageous in the invention.

In a preferred practice, the stabilizing agents of the invention are usually incorporated with the rubbery butadiene polymer, e. g. a copolymer of styrene and butadiene, in latex form in amount sufficient to provide from 0.1 to 5 percent by weight of the stabilizer based on the weight of the final composition, i. e. the sum of the weights of the rubbery butadiene polymer and the hard vinyl aromatic polymer, after which the latex is dried in usual ways such as by spray drying or drum drying to recover the butadiene polymer containing the stabilizing agent dispersed throughout. The butadiene polymer containing the stabilizing agent is intimately blended with the hard vinyl aromatic polymer at heat-plastifying temperatures on compounding rolls, a Banbury mixer or in a plastics extruder to obtain the stabilized compositions or product.

Small amounts of additives such as dyes, colors, pigments, plasticizers, flow agents, lubricants, mold release agents, etc., can also be incorporated with the polymeric materials, but the use of such additives is not required. When used, the additives are usually employed in amounts of from 0.1 to 10 percent by weight of the polymeric materials.

The following examples illustrate ways in which the principle of the invention has been applied, but are not to be construed as limiting its scope.

EXAMPLE 1

To a charge of GR-S 2003 latex, an aqueous colloidal dispersion of a copolymer of approximately 70 percent by weight of butadiene and 30 percent of styrene prepared by polymerizing a mixture of the monomers in aqueous emulsion, containing 70 percent by weight of the copolymer, there was added 10 percent by weight, based on the weight of copolymer, of N,N,N',N'-tetra-(2-hydroxypropyl)ethylene diamine. The aqueous mixture was spray dried and the solid material recovered. This dried rubbery copolymer was mixed with polystyrene in proportions corresponding to 93.5 parts by weight of the polystyrene and 6.5 parts of the copolymer. The mixture was heat-plastified and mechanically worked in a Banbury mixer at a temperature of 370° F. for a period of about 10 minutes. After a uniform composition was obtained, there was added a mixture of one percent by weight of butyl stearate and 0.1 percent of cumene hydroperoxide, based on the weight of the polymeric ingredients. The resulting mixture was intimately blended at said temperature into a uniform composition, then was removed from the mixer, allowed to cool and was cut to a granular form. Portions of the composition were injection molded to form test bars having the dimensions ½ x ⅛ inch by 0.1 inch thick. The test bars were employed to determine the tensile strength and percent elongation for the composition by procedures similar to those described in ASTM D638-49T. Other of the test bars were subjected to an accelerated weathering test in a standard Fadeometer for a period of 24 hours. Thereafter, the bars were tested to determine the tensile strength and percent elongation after exposure. For purpose of comparison similar compositions were prepared from the polystyrene and GR-S 2003 latex solids without an added stabilizing agent and tested under similar conditions. Table I gives the reults obtained in the experiments.

*Table I*

| Run No. | Added Agent | | Elongation | | |
|---|---|---|---|---|---|
| | Kind | Amount, Percent | Before Exposure, Percent | After Exposure, Percent | Retention, Percent |
| 1 | None | 0.0 | 15.7 | 5.4 | 34.4 |
| 2 | N,N,N',N'-tetra-(2-hydroxypropyl) ethylene diamine. | 0.65 | 14.2 | 11.6 | 81.6 |

EXAMPLE 2

To a charge of GR-S 2003 latex similar to that described in Example 1, there was added 10 percent by weight of N,N,N',N'-tetra-(2-hydroxypropyl)ethylene diamine, based on the weight of the copolymer. The resulting aqueous mixture was drum dried, i. e. by forming a layer of said material on a heated drum, evaporating the water and recovering the dried copolymer solids. The dried copolymer solids were mixed with polystyrene in proportions corresponding to 94 parts by weight of the polystyrene and 5 parts of the copolymer. The mixture was heat-plastified and compounded at a temperature of 370° F. in a Banbury mixer for a period of 4 minutes. One part by weight of butyl stearate was added. The resulting mixture was compounded for a period of 6 minutes, then removed from the mixer, allowed to cool and cut to a granular form. Portions of the composition were injection molded to form test bars and the bars tested employing procedures similar to those employed in Example 1. Other of the test bars were exposed to accelerated weathering in a Fadeometer for a period of 24 hours, then tested in similar manner. Test bars of the composition had an elongation value of 18.9 percent as initially prepared. After exposure to weathering in the Fadeometer for a period of 24 hours, test bars of the composition had an elongation value of 7.3 percent. The retention of percent elongation was 38.6 percent.

For purpose of comparison, a polymeric body prepared by dissolving 5 parts by weight of GR-S 1006 synthetic rubber, a copolymer of about 76.5 percent by weight of styrene and 23.5 percent of styrene, in 95 parts of styrene and heating the solution in a closed container to polymerize the monomers, was heat-plastified and intimately incorporated with 0.5 percent of its weight of N,N,N',N'-tetra-(2-hydroxypropyl)ethylene diamine and 1 percent of butyl stearate. Portions of the composition were injection molded and tested under similar conditions to those described above. Test bars of this composition had an elongation value of 23.2 percent as initially prepared. After exposure to weathering in a Fadeometer for a period of 24 hours, the composition had an elongation value of only 4.1 percent. The retention of percent elongation was only 17.7 percent.

EXAMPLE 3

In each of a series of experiments, a synthetic latex of a rubbery polymer as identified in the following table was mixed with a latex of polystyrene, prepared by polymerizing styrene in aqueous emulsion, and N,N,N',N'-tetra-(2-hydroxypropyl)ethylene diamine in proportions as stated in the table. The resulting aqueous dispersion was spray dried and the solid material recovered. The solid material was mixed with heat-plastified polystyrene having a viscosity characteristic (10 weight percent solution of the polystyrene in toluene at 25° C.) of 40 centipoises in proportions as stated in the table and the resulting mixture compounded at a temperature of about 370° F. in a Banbury mixer to obtain a uniform composition. Thereafter, the composition was removed from the mixer, was allowed to cool and was cut to a granular form. Portions of the composition were injection molded to form test bars of ½ x ⅛ inch by 4 inches long. Some of the test bars were used to determine an elongation value for the composition as initially prepared by procedure similar to that described in ASTM D638-49T. Other of the test bars were subjected to an accelerated weathering test in a standard Fadeometer for a period of 24 hours. Thereafter, the bars were tested to determine the elongation value for the composition. Table II identifies the compositions by naming the rubbery polymer and gives the proportions of latex solids and polystyrene employed in preparing the same. The table also gives the proportions in percent by weight of the polymeric components in the final composition and the percent elongation for the composition as initially prepared, the percent elongation after exposure to weathering in the Fadeometer for a period of 24 hours and the loss in elongation. For brevity the term "Quadrol" is employed in the table to designate the compound N,N,N',N'-tetra-(2-hydroxypropyl)ethylene diamine.

*Table II*

| Run No. | Latex Starting Materials | | | | | Product and Properties | | | | |
|---|---|---|---|---|---|---|---|---|---|---|
| | Rubbery Polymer Latex | | | Polystyrene Latex Solids, Weight Percent | Quadrol, Weight Percent | Latex Solids, Weight Percent | Polystyrene, Weight Percent | Elongation | | |
| | Butadiene Percent | Styrene Percent | Solids Weight Percent | | | | | Initial Percent | After Exposure, Percent | Retention, Percent |
| 1 | 70 | 30 | 80 | 15 | 5 | 12.5 | 87.5 | 5.8 | 4.9 | 84.5 |
| 2 | 70 | 30 | 75 | 15 | 10 | 13.3 | 86.7 | 6.4 | 7.4 | [1]115 |
| 3 | 70 | 30 | 70 | 15 | 15 | 14.3 | 85.7 | 6.7 | 7.0 | [1]104 |
| 4 | 70 | 30 | 65 | 15 | 20 | 15.4 | 84.6 | 6.1 | 6.7 | [1]110 |
| 5 | 83 | 17 | 75 | 15 | 10 | 13.3 | 86.7 | 9.8 | 8.2 | 83.5 |
| 6 | 100 | 0 | 75 | 15 | 10 | 13.3 | 86.7 | 20.7 | 15.5 | 75 |

[1] The elongation value for the composition after exposure to light in the Fadeometer was greater than the elongation value for similar test bars of the composition as initially prepared.

EXAMPLE 4

To a charge of a synthetic latex prepared by polymerizing a mixture of 55 percent by weight of styrene and 45 percent of butadiene in aqueous emulsion, which latex contained 48 percent by weight of copolymer solids, there was added 2 percent, based on the weight of the copolymer, of N,N,N',N'-tetra-(2-hydroxypropyl)ethylene diamine. The resulting mixture was spray dried and the solids collected. A charge of 35 parts by weight of the polymer solids was added to 64 parts of a copolymer of 75 percent by weight of styrene and 25 percent of alpha-methyl styrene having a viscosity characteristic of 10 centipoises determined on a 10 weight percent solution of the polystyrene in toluene at 25° C., together with 1 part of butyl stearate. The resulting mixture was compounded in a Banbury mixer at a temperature of 370° F. for a period of about 10 minutes to obtain a uniform composition. It was removed from the mixer, allowed to cool and cut to a granular form. Portions of the composition were injection molded to form test bars having the dimensions ½ x ⅛ inch by 4 inches long. Part of the test bars were used to determine an elongation value for the composition as initially prepared. Other of the test bars were exposed to weathering in a Fadeometer for a period of 24 hours and were tested for percent elongation after exposure. The composition had an elongation value of 25 percent as initially prepared. After exposure to light in the Fadeometer for a period of 24 hours, the composition had an elongation of 12 percent. The retention of elongation was 48 percent.

In a similar experiment wherein 4 percent of N,N,N',N'-tetra-(2-hydroxypropyl)ethylene diamine, based on the weight of the copolymer, was added to the latex and 35 parts of the spray dried copolymer solids, 64 parts of the copolymer of styrene and alpha-methyl styrene and 1 part of butyl stearate were heat-plastified and compounded into a uniform composition, the composition had an elongation value of 22.2 percent as initially prepared and 15.3 percent after exposure to light in a Fadeometer for a period of 24 hours. The retention of elongation was 69 percent.

EXAMPLE 5

To a charge of GR-S 2003 latex, a synthetic latex of a copolymer of approximately 70 percent by weight of butadiene and 30 percent of styrene prepared by polymerizing a mixture of the monomers in aqueous emulsion, which latex contained 70 percent by weight of the copolymer, there was added 10 percent by weight of N,N,N',N' - tetra - (2 - hydroxypropyl)ethylene diamine, based on the weight of the copolymer. The aqueous mixture was spray dried and the copolymer solids recovered. The dried copolymer solids were mixed with granules of a solid vinyl aromatic polymer as identified in the following table in proportions corresponding to 93.5 parts by weight of the solid polymer and 6.5 parts of the rubbery copolymer. The mixture was heat-plastified and mechanically worked in a Banbury mixer at a temperature of 370° C., together with one percent by weight of butyl stearate, for a period of about 10 minutes. The ingredients were intimately blended into a uniform composition. The composition was removed from the mixer, allowed to cool and was cut to a granular form. Portions of the composition were injection molded to form test pieces having the dimensions ½ x ⅛ inch by 4 inches long. Part of the test pieces were employed to determine a percent elongation value for the composition, as initially prepared, by a procedure similar to that described in ASTM D638–49T. Other of the test pieces were exposed to light in a standard Fadeometer for a period of 24 hours. Thereafter, the test pieces were removed and tested to determine the percent elongation after exposure to light and weathering in the Fadeometer. Table III identifies the experiments and gives the proportion of the polymeric ingredients employed in preparing the same. The table also gives the elongation values for the composition as initially prepared, after exposure in the Fadeometer and the percent retention of elongation. For brevity the term "Quadrol" is employed in the table to designate the compound N,N,N',N' - tetra - (2 - hydroxypropyl)ethylene diamine.

*Table III*

| Run No. | Starting Materials | | | | | Product | | |
|---|---|---|---|---|---|---|---|---|
| | Polymer | | Rubber, Percent | Quadrol, Percent | Butyl Stearate, Percent | Elongation | | |
| | Kind | Percent | | | | Before Exposure, Percent | After Exposure, Percent | Retention, Percent |
| 1 | Polystyrene | 93.5 | 6.5 | 0.65 | 1 | 20.8 | 17.8 | 85.6 |
| 2 | 70% Styrene—30% methylmethacrylate | 93.5 | 6.5 | 0.65 | 1 | 20.2 | 16.5 | 81.7 |
| 3 | 75% Styrene—25% alpha-methyl styrene | 93.5 | 6.5 | 0.65 | 1 | 18.5 | 12.2 | 66.0 |

I claim:

1. A composition of matter comprising a polymeric body, the essential ingredients of which are a mechanical blend of from 60 to 95 percent by weight of a normally hard thermoplastic vinyl aromatic polymer selected from the group consisting of polymerized monovinyl aromatic hydrocarbons and copolymers of at least 70 percent by weight of at least one monovinyl aromatic hydrocarbon and not more than 30 percent of a compound selected from the group consisting of acrylonitrile, alpha-methyl styrene, and alkyl esters of acrylic acid and methacrylic acid containing from 1 to 4 carbon atoms in the alkyl group, and from 40 to 5 percent of a soft rubbery butadiene polymer selected from the group consisting of polymerized butadiene and copolymers of at least 40 percent by weight of butadiene and not more than 60 percent of styrene, intimately incorporated with one another and as a stabilizing agent therefor, from 0.1 to 5 percent, based on the sum of the weights of the polymeric ingredients, of at least one N,N,N',N'-tetra-(2-hydroxyalkyl)alkylene diamine having the general formula:

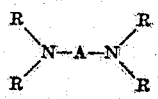

wherein A is an alkylene radical containing from 2 to 6 carbon atoms and R is a 2-hydroxyalkyl radical selected from the group consisting of the 2-hydroxyethyl and 2-hydroxypropyl radicals.

2. A composition as claimed in claim 1, wherein the vinyl aromatic polymer is polystyrene.

3. A composition as claimed in claim 1, wherein the vinyl aromatic polymer is a copolymer of at least 70 percent by weight of styrene and not more than 30 percent of methylmethacrylate.

4. A composition as claimed in claim 1, wherein the vinyl aromatic polymer is a copolymer of at least 70 percent by weight of styrene and not more than 30 percent of alpha-methyl styrene.

5. A composition as claimed in claim 1, wherein the N,N,N',N' - tetra - (2 - hydroxyalkyl)alkylene diamine is N,N,N',N' - tetra - (2 - hydroxypropyl)ethylene diamine.

6. A composition as claimed in claim 5, wherein the vinyl aromatic polymer is polystyrene.

7. A composition as claimed in claim 5, wherein the vinyl aromatic polymer is a copolymer of 70 percent by weight of styrene and 30 percent of methylmethacrylate.

8. A composition as claimed in claim 5, wherein the vinyl aromatic polymer is a copolymer of 75 percent by weight of styrene and 25 percent of alpha-methyl styrene.

References Cited in the file of this patent

UNITED STATES PATENTS

| | | |
|---|---|---|
| 2,540,996 | Ryden | Feb. 6, 1951 |
| 2,697,118 | Lundsted et al. | Dec. 14, 1954 |
| 2,732,366 | Tubbs et al. | Jan. 24, 1956 |
| 2,765,292 | Groff et al. | Oct. 2, 1956 |

OTHER REFERENCES

Wyandotte, Quadrol Technical Data Sheet, published by Wyandotte Chemicals Corporation, Wyandotte, Mich., Market Development, May 9, 1956.